Figure 1:
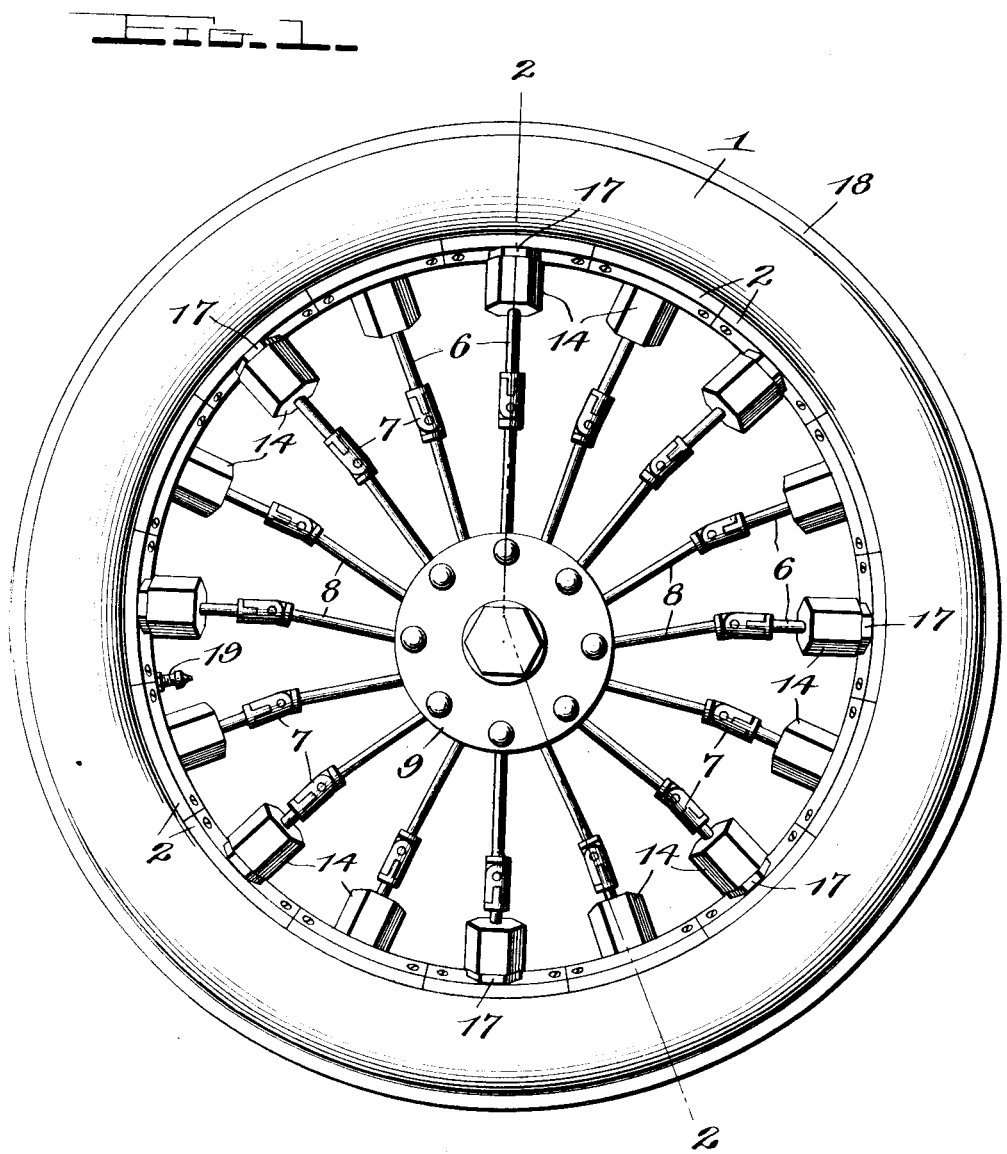

L. H. SCHOONOVER.
RESILIENT VEHICLE WHEEL.
APPLICATION FILED AUG. 23, 1913.

1,080,720.

Patented Dec. 9, 1913.
2 SHEETS—SHEET 1.

Witnesses

Inventor
L. H. Schoonover,
By Jerry A. Mathews
Attorney

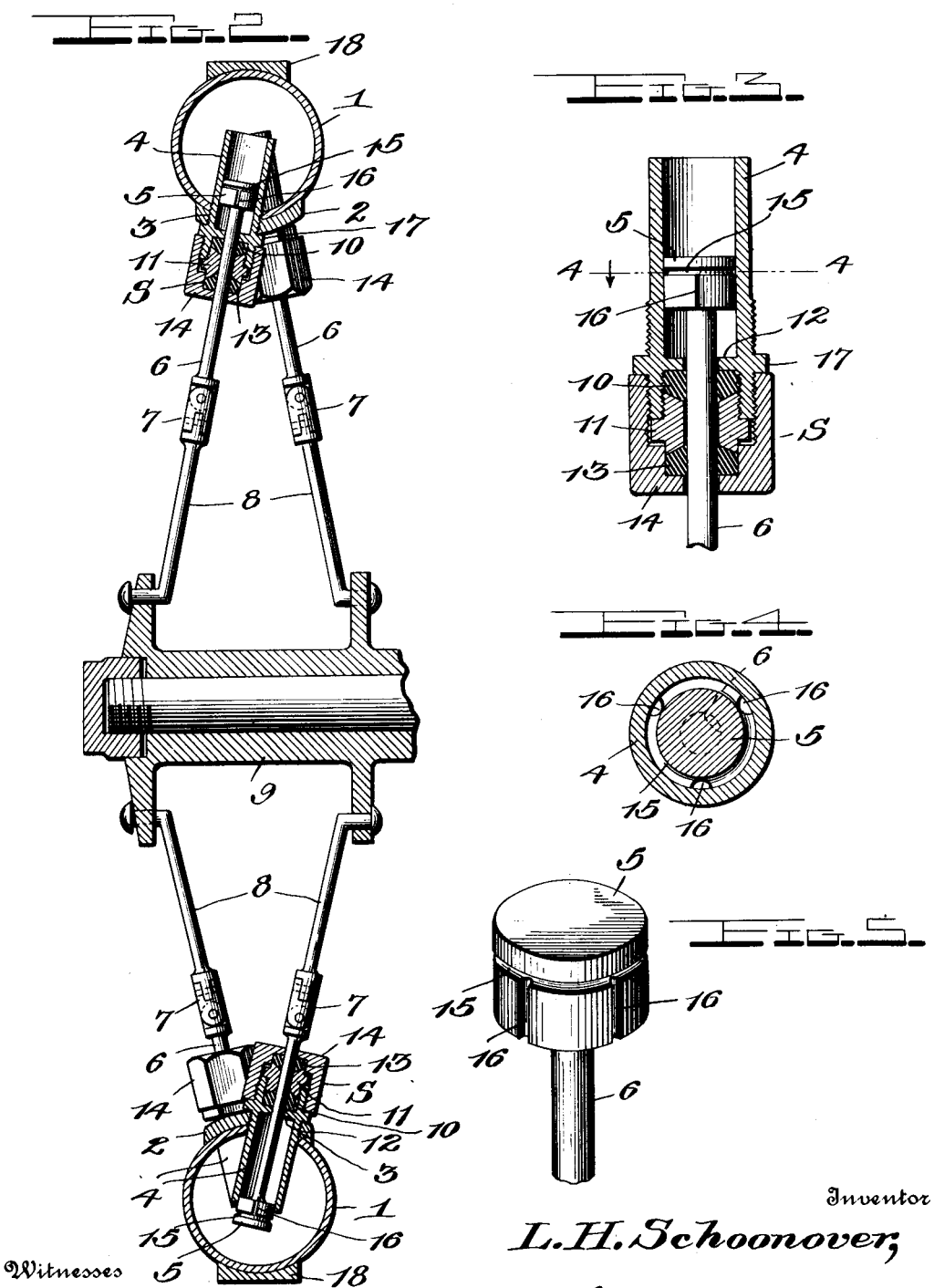

UNITED STATES PATENT OFFICE.

LEM H. SCHOONOVER, OF BOISE, IDAHO.

RESILIENT VEHICLE-WHEEL.

1,080,720.   Specification of Letters Patent.   Patented Dec. 9, 1913.

Application filed August 23, 1913. Serial No. 766,291.

*To all whom it may concern:*

Be it known that I, LEM H. SCHOONOVER, a citizen of the United States, residing at Boise, in the county of Ada and State of Idaho, have invented a new and useful Resilient Vehicle-Wheel, of which the following is a specification.

The object of my invention is to provide an improved resilient vehicle-wheel which may be adapted for use with any kind of vehicle; to provide novel means for imparting resiliency; and to provide a wheel in which the weight at the hub is supported from the uppermost portion of the wheel, and which permits the resilient movement of the hub to an eccentric position relative to the tire or rim under strain.

It is a further object of my invention to provide novel spoke mechanism for a wheel of this type, which shall afford both strength and flexibility and make possible the use of a relatively small number of spokes.

It is an especial object of my invention to provide a puncture-proof resilient wheel adapted for use on automobiles.

It is also an object of my invention to provide mechanism in which compressed air is the resilient element and which does not require springs or pneumatic tires, and to provide a novel combination and arrangement of parts as hereinafter set forth.

Referring to the drawings which illustrate my invention, and which are to be considered in connection with my specification, Figure 1 is a front elevation of my resilient vehicle-wheel when under load; Fig. 2 is a vertical section on line 2—2 of Fig. 1; Fig. 3 is an enlarged detail view of the cylinder and piston; Fig. 4 is a detail cross section on line 4—4 of Fig. 3; Fig. 5 is a detail perspective of the piston.

Like characters of reference indicate like parts throughout the several views.

As illustrated in the drawings, I provide a metallic tubular rim 1, over which is shrunk a flat rubber tire 18 to form the tread, when the wheel is used on automobiles or motorcycles, or I may use a steel tread. Secured to the inner portion of the metallic tubular rim I are a plurality of felly segments 2, having threaded orifices 3 to correspond with similar orifices in the tubular rim 1, and in which are mounted the radial cylinders 4. Each cylinder is provided with a piston 5, secured to a piston rod 6, which in turn is secured to a knuckle joint member 7, which latter member is secured to a spoke 8, which is secured to the hub 9 of my vehicle wheel.

Each cylinder is provided with a suitable stuffing box, indicated by the letter S. My stuffing box consists of packing 10, a gland or bushing 11, which screws to the interior of the cylinder, holding the packing tightly in position against the inner cylinder flange 12. Another packing 13 is held in place by the cylinder cap 14, which screws on the exterior of the cylinder. Each piston 5 is provided with a circumferential groove 15, and with one or more, preferably three, longitudinal air grooves 16 extending from the circumferential groove to the inner end of the piston, thus forming a conduit to the interior of the cylinder, as illustrated in the detail views in the drawings. My stuffing box provides an air-tight closure for the outer end of the cylinder, while at the inner end the portion of the piston beyond the circumferential groove 15 is fitted to within one-hundredth part of an inch of the end of the cylinder. A valve of ordinary construction or nipple 19 is provided in the tubular rim 1, as illustrated in Fig. 1, so that air may be supplied to it under pressure. I also provide an outer cylinder flange 17 for each cylinder, preferably, for the purpose of greater security, as will be obvious from the drawings.

In operation, the axle, mounted in hub 9, is supported from the top or uppermost portion of the wheel at all times, and weight on the hub tends to project that member into an eccentric position relative to the tubular rim 1, such movement being made possible by the cylinder and piston mechanism to which the spokes are attached, the pull on the spokes tending to compress the air in the cylinders under the pressure of the pistons and give resiliency to the wheel. Thus when the wheel comes in contact with an obstacle, the hub goes down a little and takes off the jar, compressing the air in the upper cylinders, and projecting the pistons in the lower or opposite cylinders beyond the circumferential groove or sufficient to refill the cylinder with air from the outer casing, or tubular rim 1, which operation is facilitated by having the tubular rim filled with compressed air. The tubular rim 1 should contain a sufficient quantity of high grade oil to keep the cylinders in perfect working condition at all times.

The knuckle joint members connecting the spokes with the piston rods affords flexibility while making possible the use of a large strong spoke, thus permitting of the employment of a relatively small number of cylinders, each spoke being operatively connected with the piston in one cylinder.

The tubular rim 1 may be made of hollow pressed steel, hollow malleable cast iron, hollow aluminum or other suitable metal for automobile or similar tires, and it is within the contemplation of my invention to combine my cylinder, piston and spoke mechanism with rims of any material by suitable modifications not herein set forth in detail, the rim illustrated in the drawings being the preferred form of my invention.

What I claim is:

1. In a resilient vehicle wheel, the combination of a rim, radially-disposed cylinders secured thereto, pistons having longitudinal grooves and a circumferential groove out of which the first-named grooves open to form air conduits to the interior of the cylinders, stuffing boxes forming air-tight closures for the inner-ends of the cylinders, piston rods secured to the pistons, knuckle joint members secured to the piston rods, spokes secured to the knuckle joint members, and a hub to which the spokes are attached.

2. In a resilient vehicle wheel, the combination of a metallic tubular rim, a flat rubber tire shrunk over the rim and forming the tread, radially-disposed cylinders extending partly within and partly without the tubular rim, felly mechanism to securely fasten the cylinders in position, pistons having one or more longitudinal grooves and a circumferential groove out of which the aforesaid longitudinal grooves open to form air conduits to the interior of the cylinders, stuffing boxes forming air-tight closures for the cylinder ends, piston rods secured to the pistons, knuckle joint members secured to the piston rods, spokes secured to the knuckle joint members, and a hub to which the spokes are attached, substantially as set forth.

In testimony whereof, I have hereunto set my hand in the presence of two witnesses.

LEM H. SCHOONOVER.

Witnesses:
HENRY W. BAKER,
LEE ESTES.